United States Patent [19]

Stansfield et al.

[11] Patent Number: 4,978,480
[45] Date of Patent: Dec. 18, 1990

[54] METHOD OF MAKING NUCLEAR FUEL COMPACTS

[75] Inventors: Orlin M. Stansfield, San Diego; Robert W. Schleicher, Jr., Carlsbad, both of Calif.

[73] Assignee: General Atomics, San Diego, Calif.

[21] Appl. No.: 291,549

[22] Filed: Dec. 29, 1988

[51] Int. Cl.$^5$ .............................................. G21C 21/00
[52] U.S. Cl. ..................................... 264/0.5; 376/411; 376/414; 376/901
[58] Field of Search .................. 376/411, 414; 264/0.5

[56] References Cited

U.S. PATENT DOCUMENTS

| | | | |
|---|---|---|---|
| 3,945,884 | 3/1976 | Freck | 176/68 |
| 3,992,258 | 11/1976 | Tobin | 176/67 |
| 3,994,822 | 11/1976 | DeBacci et al. | 252/301.1 |
| 4,006,096 | 2/1977 | Forthmann et al. | 252/301.1 |
| 4,064,204 | 12/1977 | Leary et al. | 264/0.5 |

*Primary Examiner*—Stephen J. Lechert, Jr.
*Assistant Examiner*—Nina Bhat
*Attorney, Agent, or Firm*—Fitch, Even, Tabin & Flannery

[57] ABSTRACT

Nuclear fuel particles having fission-product-retentive characteristics are disclosed which are particularly adapted for the production of nuclear fuel compacts or nuclear fuel elements by combination with a matrix material having an acceptable nuclear properties and good thermal conductivity. Preferably, the outermost shell of the fission-product-retentive layer is formed of a refractory carbide, such as silicon carbide or zirconium carbide, and a thin overcoating material is applied thereto. When aluminum is employed as the matrix material, an overcoating of elemental silicon or elemental zirconium is used which is wet by the aluminum matrix. Silicon also forms a low melting eutectic alloy with the aluminum of the matrix that provides good lubricating properties—a particularly valuable feature when high pressure extrusion is used to form fuel elements. In addition, a strong chemical bond is formed between silicon and a refractory silicon carbide outer surface, resulting in an excellent heat flow path from the nuclear fuel to the boundary of the fuel element from which heat transfer occurs.

19 Claims, No Drawings

METHOD OF MAKING NUCLEAR FUEL COMPACTS

The invention relates generally to nuclear fuel particles less than a few millimeters in size and to methods of making nuclear fuel compacts from such particles for use in nuclear reactors. More particularly, the invention relates to improved nuclear fuel particles having fission-product-retentive coatings which withstand high pressures to which they may be subjected during the formation of nuclear fuel compacts, to such nuclear fuel compacts, and to methods for making nuclear fuel compacts having a good thermal pathway to the nuclear fuel material.

BACKGROUND OF THE INVENTION

Pyrolytic carbon coatings have been used to protect particles of nuclear reactor fuel, i.e., fissile and/or fertile materials, such as uranium, plutonium and thorium in the form of suitable compounds thereof. Coatings of aluminum oxide and other ceramic oxides have also been proposed. Examples of nuclear fuel particles employing pyrolytic carbon coatings include U.S. Pat. No. 3,325,363, issued June 13, 1967; No. 3,298,921, issued Jan. 17, 1968, and No. 3,361,638, issued Jan. 2, 1968. It is also known to incorporate one or more layers of refractory carbide materials, such as silicon carbide or zirconium carbide, to produce nuclear fuel particles having still better fission product retention characteristics, as disclosed in U.S. Pat. No. 3,649,472, issued Mar. 14, 1972. So long as these fission product retentive coatings remain intact, contamination exterior of the particles by the heavy metal fuel material and/or substantial spread of fission products exterior of the coatings is prevented.

Nuclear fuel particles of this type are generally bonded together in some fashion to create an object which is termed in the art either a nuclear fuel compact or, depending upon its size, nuclear fuel element. It has been found that fracture and/or cracking of the fission-product-retentive-coatings can occur during the formation of these larger objects wherein the nuclear fuel particles are combined with a matrix material of some type. As a result, the search continues for improved nuclear fuel particles which are better suited for manufacturing processes of this type wherein they will be combined into larger objects with the use of such a matrix material.

BRIEF SUMMARY OF THE INVENTION

Nuclear fuel particles are formed of cores of fissile or fertile nuclear fuel material of generally spheroidal shape, which cores are surrounded with a multiple layer fission-product-retentive arrangement designed to retard the escape of fission products through levels of reasonable burnup of the nuclear fuel. This fission-product-retentive system will usually include a layer or shell of a high-temperature stable, refractory carbide, such as silicon carbide, and the refractory carbide may constitute the outer shell of the fission-product-retentive system. A thin layer of an elemental substance overcoats the fission-product-retentive arrangement and is of such a character that the substance is wet by the desired metallic matrix material. As a result, when the particles and the metallic matrix material are subjected, for example, to a high pressure extrusion process for the formation of nuclear fuel elements, the hydrostatic forces are equilibrated and spread across the entire surface of the fuel particles so as to not only preserve the integrity of the fission-product-retentive arrangement, but also to lubricate the outer surface of each particle. Moreover, an overcoating material is preferably chosen which forms a eutectic with the metallic matrix material having a lower melting point, and as a result, establishes a good thermal bond between the individual particles and the matrix material, assuring a good thermal pathway from the nuclear fuel particles to the boundaries of the nuclear fuel compact or element from which surfaces of heat extraction to a flowing coolant will occur.

DETAILED DESCRIPTION OF THE PREFERRED EMBODIMENTS

Very generally, nuclear fuel particles are provided which have central cores of fissile or fertile material surrounded by one or more layers of materials designed to retain within the confines thereof substantially all of the fission products created during burnup of the fissile atoms to a reasonable level. Various layers of materials, such as pyrolytic carbon and silicon carbide, as are known in the art, or other comparable fission-product-retentive materials, can be employed which provide good structural and dimensional stability and fission-product retention even when exposed to high temperatures in high level irradiation for long periods, such as will be encountered in the core of a nuclear power reactor. Other suitable fission-product-retentive materials can also be used as a part of the overall fission-product-retentive coating arrangement that surrounds the fissile or fertile cores while still obtaining the benefit the overcoating provides to avoid fracture and/or cracking.

Although the central cores of nuclear fuel material may have different shapes, they are normally generally spherical in shape, and generally the diameter of the sphere will be not greater than about 1 millimeter (1,000 microns). Usually, nuclear fuel will be in the form of spheres between about 100 microns and about 500 microns in diameter. Preferably, fissile fuel cores have a diameter not greater than about 550 microns, and preferably fertile fuel cores are not greater than about 650 microns in diameter. Such so-called fertile fuel cores may contain mixtures of both fissile and fertile materials, for example, mixtures of uranium and thorium compounds. Core materials in the form of oxides or carbides or mixtures thereof are generally used, although other suitable forms, such as the nitride or the silicide, which are stable at relatively high temperatures, could alternatively be employed. Preferably, the fissile fuel cores are formed of mixtures of uranium oxide and uranium carbide; however, uranium oxides, uranium carbides or thorium/uranium carbides could also be employed. On the other hand, fertile fuel cores generally contain a suitable, high-temperature, stable thorium material, such as thorium oxide or thorium carbide; and a mixture of thorium carbide and thorium oxide or a mixture of thorium oxide and uranium oxide might be employed.

Because nuclear fuel materials generally expand during high-temperature operation and create gaseous and metallic fission products during fissioning, it is well known to make provision to accommodate these effects in order to facilitate prolonged operation under exposure to nuclear flux. Because the density of the core material is usually dictated by other manufacturing process considerations and/or design criteria, cores are normally of relatively dense material and thus unable to accommodate the accumulation of such gaseous fission products within the core region itself. As a result, an initial layer of relatively low density material is provided near the surface of the core to accommodate expansion at a location interior of the outer coatings which constitute the pressure-tight shell and to also accommodate gaseous fission products. The layer which surrounds the core should also be chemically compatible with the core material, both in the environment in which it is deposited and within the nuclear reactor where levels of high neutron flux will be accommodated. Spongy, pyrolytic carbon, which is a soot-like amorphous carbon having a diffuse X-ray diffraction pattern, is well known in the art and commonly employed for this purpose. Such spongy pyrocarbon also attenuates fission recoils and prevents structural damage to the outer layers, and as such it is generally employed somewhere between 20 microns and about 100 microns in thickness.

The intermediate layers which create the pressure-tight shell are often a combination of layers of relatively dense isotropic pyrolytic carbon and of silicon carbide or zirconium carbide of sufficient thickness to provide good retention of metallic fission products. In general, dense, isotropic, pyrolytic carbon has good dimensional stability and, as such, is often provided immediately interior of and can also be provided immediately exterior of such a silicon carbide layer. The interior pyrocarbon layer is usually about 20–50 microns thick.

Dense isotropic carbon has both good impermeability to gas and good dimensional stability during neutron irradiation, and generally its isotropy should measure not more than about 1.2 on the Bacon scale. Such dense isotropic pyrolytic carbon can be deposited at relatively low temperatures, e.g., 1,250 to 1,400° C. or at temperatures at between 1,800 to 2,200° C. At higher temperatures, a gas mixture containing about 10% by volume methane can be used, whereas at lower temperatures mixtures of about 20–40% propane or butane can be used. In general, about 25-50 microns, e.g. about 35 microns, of dense isotropic pyrolytic carbon is employed interior of the metal carbide layer, and it should have a density of at least about 80% of the theoretical maximum density, e.g., about 1.85 to 1 95 g/cm$^3$.

Generally, a continuous layer of silicon carbide or zirconium carbide between about 20 microns to 45 microns in thickness is employed to assure adequate containment of metallic fission products is achieved. Such silicon carbide or zirconium carbide layers can be applied in any suitable manner to achieve satisfactory densities which are usually at least about 90% of the theoretical maximum density of the carbide material. Such a layer can be advantageously deposited from a vaporous atmosphere in a fluidized bed coating apparatus or the like as, for example, that described in detail in U.S. Pat. No. 3,298,921. For example, silicon carbide can be directly deposited from a mixture of hydrogen and methyltrichlorosilane, which easily produces densities of about 99% of maximum theoretical density.

The foregoing describes certain multiple layer fission-product-retentive coating arrangements that can be used to provide a pressure-tight barrier about a nuclear fuel material core; as indicated hereinbefore, other suitable fission-product-retentive arrangements can be employed. It is contemplated that these fission-product-retentive nuclear fuel particles should retain therewithin substantially all of the fission products generated throughout a burnup of up to about 30% of the fissile and/or fertile atoms present in the core. Very generally, the outer dimension of the coated nuclear fuel particle will usually not exceed the range of about 3 to 5 millimeters, even if a nuclear fuel core as large as about 1 millimeter were employed.

If desired, a layer of a mechanically protective substance, for example, pyrocarbon or aluminum oxide having a density up to about 60% of its theoretical maximum density and of a thickness of about between 15 and 45 microns, can be applied as a cushioning layer exterior of the refractory carbide layer. However, in most instances, the inclusion of such a cushioning layer is not considered to be necessary, and the overcoating of the elemental substance is applied directly to the outer surface of the fission-product-retentive arrangement which, as indicated hereinbefore, is preferably the refractory carbide shell.

The elemental substance is chosen based upon the chemical character of the metallic matrix material, and one matrix material which is commonly employed in fuel elements is aluminum. Other suitable metallic matrix materials can be used There should preferably be mutual solubility between matrix and silicon, and such materials should have a melting point between about 500° C. and about 1,400° C. When aluminum is the prospective matrix material, elemental silicon is the preferred substance for overcoating the nuclear fuel particles. Preferably, the overcoating will have a thickness of at least about 3 microns, and generally a layer between about 3 and about 5 microns will be used. Although overcoatings having a thickness of 10 microns or even thicker can be employed, there is not felt to be any particular advantage in using an overcoating more than about 5 microns in thickness. As indicated hereinbefore, the overcoating substance should be one which is "wet" by the matrix material, and in this context, the term "wet" means that the matrix material will chemically bond to the surface of the particle overcoating Stated another way, there should be a chemical affinity between the matrix material and the overcoating substance so that there is a propensity for a compound or a solid solution at the matrix and the overcoating material to form at the interface therebetween. The affinity could be as strong as covalent bonding or could be of a lesser magnitude. Elemental zirconium is an example of another substance which may be employed for the overcoating, particularly when an aluminum matrix material is used.

In addition to being wet by the aluminum matrix material, silicon has the property of forming a low-melting alloy or eutectic with it, which assures cohesive surface contact is achieved Furthermore, silicon is slightly soluble in aluminum, and a eutectic is formed including about 12 atom percent silicon which has a melting point of about 577° C., i.e., about 100° C. below the melting point of pure aluminum which is about 660° C. As a result, cohesive surface contact within the extruded object is assured even if the extrusion is carried out at temperatures below the melting point of pure aluminum, which is particularly advantageous because, in most extrusion processes, the temperature is maintained below the melting point of aluminum, e.g., at about 600° C. or lower, so as to avoid the difficulties incumbent in handling a molten material.

When the fission-product-retentive arrangement has an outer shell of silicon carbide, the use of elemental silicon has a further advantage of creating a strong chemical bond to the outer surface of the dense silicon carbide material The result of such a bond at the silicon carbide surface and the cohesive surface contact with the matrix material assures a very good thermal pathway from the nuclear fuel particle through the matrix to the boundary surface from which heat transfer occurs. Similarly, if an exterior shell of zirconium carbide is used on the fuel particles, elemental zirconium may be the preferred substance for the overcoating.

Fuel compacts or fuel elements (the terms being used interchangeably for purposes of this application) made of fission-product-retentive nuclear fuel particles and a matrix of metallic aluminum may be produced by extruding at a temperature of at least about 400.C. using high extrusion pressures of about 10,000 psig. or greater. However, even higher extrusion temperatures and pressures are commonly used, and it is not uncommon to extrude such fuel elements of a tubular shape at temperatures between about 575 and 600 C. and pressures of about 100,000 psig. Needless to say, at such high extrusion pressures, there is a distinct possibility that differential pressures acting upon the outer surfaces of the nuclear fuel particles could promote fracture of the fission-product-retentive layers; however, the affinity between the matrix material and the overcoating material which results from the continuous wetting equilibrates prospective differential pressures that would normally be a part of such an extrusion operation and thus very substantially reduces such fractures.

The exterior diameter of the coated nuclear fuel particle which includes the protective overcoating and its encapsulating shell will vary depending upon the size of the core and the thickness of the pressure-tight barrier. Preferably, however, the outer diameter of fertile nuclear fuel particles does not exceed about 1,300 microns, and the outer diameter of particles having fissile fuel cores does not exceed about 1,200 microns. Commonly these particles are in the range between about 400 and about 900 microns.

The following example illustrates a preferred method for making nuclear fuel particles, and nuclear fuel compacts utilizing such particles, of the types generally herein described. However, this example should be understood to in no way limit the scope of the invention which is defined by the appended claims.

EXAMPLE

Minute spheres of a mixture of uranium oxide and uranium carbide are prepared having a major portion of uranium oxide material. Stoichiometrically, the spheres can be viewed as having the composition $UC_{0.3}O_{1.7}$. The particle size of the spheres is about 500 microns, and the spheres are considered as being substantially fully dense.

The spheres are heated in a suitable coating apparatus in a fluidized bed to a temperature about 1,100° C. using a levitating flow of argon. A buffer coating of spongy pyrocarbon is deposited at about atmospheric pressure from acetylene gas and argon, each at about 50 volume percent (v/o). The acetylene decomposes and deposits low density, spongy carbon upon the cores, and flow is continued for sufficient time to deposit a layer about 40 microns thick having a density about 1.1 gram per cc.

The flow of acetylene is then terminated, and the temperature is raised to about 1200.C. Propylene at about 3 volume percent is injected into the stream, and coating is carried out for about 20 minutes. This produces a thin, anisotropic coating of generally laminar carbon having a density of about 1.9 grams per $cm^3$.

The buffer-coated cores are then heated to about 1,400° C., and a mixture of about 12 v/o propylene, about 12 v/o acetylene, about 22 v/o argon, and the remainder hydrogen is employed to deposit a layer of isotropic pyrocarbon about 35 microns thick having a density of about 1.95 $g/cm^3$ and a BAF of about 1.1.

The temperature is then raised to about 1,600° C., and hydrogen alone is used as the fluidizing gas with about 10% by volume of the hydrogen stream being bubbled through a bath of methyltrichlorosilane. After about three and one-half hours at these conditions, silicon carbide has been uniformly deposited upon the carbon-coated spheres in the form of a layer of about 35 microns thick. Subsequent measurement and examination shows that the silicon carbide is beta-phase SiC having a density of about 3.18 $g/cm^3$, which is about 99% of theoretical density of silicon carbide.

The silicon carbide-coated cores are maintained in this fluidized condition substituting argon or nitrogen as the fluidizing gas, and the temperature is reduced to about 700.C. At this temperature, hydrogen is again substituted as the fluidizing gas and about one volume percent of tetrachlorosilane gas is introduced into the gas stream; as a result of these conditions, elemental silicon is deposited on the exterior surface of the silicon carbide shells. After about 10 minutes, a layer of silicon about 3 to 5 microns thick has been deposited, and the injection of tetrachlorosilane is terminated. Nitrogen is substituted for hydrogen as the fluidizing stream, and the temperature of the particles is slowly lowered to about ambient temperature, terminating the coating operation.

These overcoated particles are employed to fabricate fuel elements of generally tubular shape which are circular in cross-section, and for example, to make fuel elements about 12 feet in length having an outer diameter of less than about 4 inches and an annular thickness of about 0.3 inch. A blank or a slug having the appropriate mass is first formed by blending about 12 kg. of overcoated nuclear fuel particles with about 6 kg. of aluminum in the form of sintered Al powder. Heating to a temperature of about 400 C. over a time period of about 12 hours in a suitable mold results in the formation of a relatively dense, cohesive slug suitable for extrusion purposes. When extrusion is ready to begin, the slug is heated to a temperature of about 400° C. at which the metallic matrix material softens and is fed to an extrusion press which will cause the combination of aluminum and fuel particles to be squeezed through an extrusion die using a pressure of about 200,000 psig. and a temperature of about 400° C. to create a 12 foot long tubular element of uniform cross-section with an 0.D. of about 3.5 inches and an annular thickness of about 0.3 inch. At this temperature and pressure, eutectic solution forms at the interface between the matrix material and the fuel particle overcoatings which not only exerts a lubricating effect, preventing particles from rupturing one another when contact occurs, but also equilibrates the differential pressure that would exist in an extrusion apparatus of this type and thus avoids significant fracturing of the fission-product-retentive coatings. Thereafter, the establishment of this eutectic bond promotes efficient heat flow outward from the fuel particles into the matrix.

Although the invention has been described with regard to the best mode presently understood by the inventors, changes and modifications as would be obvious to one having the ordinary skill in the art may be made without departing from the scope of the invention, which is defined in the claims appended hereto. For example, although aluminum is the preferred matrix material for fuel elements of this type because it has acceptable nuclear characteristics and relatively acceptable conductivity, other suitable metals and metal alloys may be used, for example, zirconium or an aluminum-zirconium alloy. Particular features of the invention are emphasized in the claims that follow.

What is claimed is:

1. A method of forming nuclear fuel compacts that incorporate a metallic matrix material, which method comprises the steps of
   forming spheroidal nuclear fuel particles including fissile or fertile nuclear fuel material within surrounding fission-product-retentive means,
   overcoating said nuclear fuel particles with a thin layer of an elemental substance that is wet by the matrix material,
   combining said overcoated particles and said matrix material, and
   subjecting said combination to heat and high pressure to form a fuel compact whereby the wetting of said overcoating by said matrix material equilibrates said pressure about the outer surfaces of said particles and substantially reduces fracturing of said fission-product-retentive means of said particles.

2. A method in accordance with claim 1 wherein said matrix material is aluminum.

3. A method in accordance with claim 2 wherein silicon carbide constitutes the exterior surface of said fission-product-retentive means.

4. A method in accordance with claim 3 wherein said overcoating substance is elemental silicon, which is deposited directly upon said silicon carbide, forms a good bond therewith and also alloys with said matrix as a result of said combining and subjecting steps to create a good heat flow path from said fuel material to said compact outer boundaries.

5. A method in accordance with claim 4 wherein said silicon carbide is in the form of a layer at least about 30 microns thick.

6. A method in accordance with claim 5 wherein said substance has a thickness of at least about 3 microns.

7. A method in accordance with claim 6 wherein said matrix material and particles are subjected to a pressure of at least about 10,000 psig. and a temperature of at least about 400° C.

8. A method in accordance with claim 7 wherein said matrix material and particles are extruded through a die at a temperature between about 400° C. and about 600° C. to form an elongated tubular fuel compact.

9. A method in accordance with claim 2 wherein said substance is elemental zirconium.

10. A method in accordance with claim 9 wherein zirconium carbide constitutes the exterior surface of said fission-product-retentive means.

11. A method in accordance with claim 1 wherein the outer diameter of said nuclear fuel particles is between about 500 microns and about 900 nicons.

12. A method of forming nuclear fuel compacts that incorporate nuclear fuel dispersed within a metallic matrix material, which method comprises the steps of
    providing spheroidal nuclear fuel particles including fissile or fertile nuclear fuel material within surrounding fission-product-retentive means,
    overcoating said nuclear fuel particles with a thin layer of a substance that is wet by the metallic matrix material,
    combining said overcoated particles and the matrix material in a manner so as to disperse said particles within said matrix material, and
    subjecting said combination of overcoated particles and matrix material to heat and a pressure of at least about 10,000 psig. to form a fuel compact whereby the wetting of said substance by said matrix material equilibrates said pressure about the outer surfaces of said particles and substantially reduces fracturing of said fission-product-retentive means of said particles.

13. A method in accordance with claim 12 wherein said matrix material comprises aluminum and said substance is elemental silicon.

14. A method in accordance with claim 13 wherein the exterior surface of said fission-product-retentive means is formed of silicon carbide.

15. A method in accordance with claim 14 wherein during the compact-forming step said elemental silicon forms a good bond with said silicon carbide and alloys with said aluminum matrix material.

16. A method in accordance with claim 15 wherein said combination of overcoated particles and matrix material is heated to a temperature of at least about 400° C. before being subjected to a pressure of about 100,000 psig.

17. A method in accordance with claim 12 wherein the outer diameter of said nuclear fuel particles is between about 500 microns and about 900 microns.

18. A method in accordance with claim 13 wherein said combination of overcoated particles and matrix material is extruded through a die at a temperature between about 400° C. and about 600° C. to form an elongated tubular fuel compact.

19. A method in accordance with claim 12 wherein said substance is elemental zirconium and said fission-product-retentive means has an exterior surface of zirconium carbide.

* * * * *